UNITED STATES PATENT OFFICE.

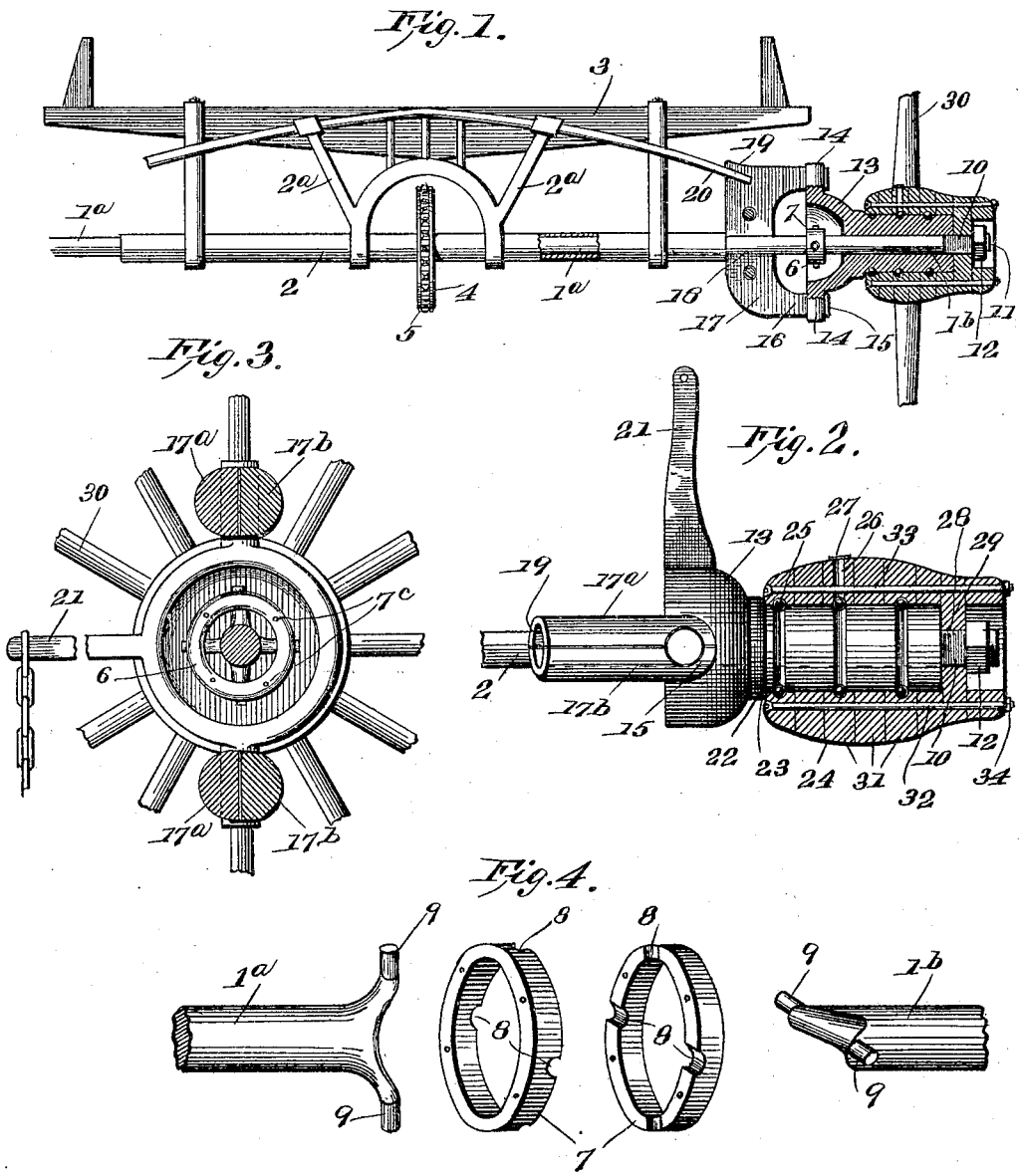

WILLIAM KNOX CLEVELAND, OF ST. PETERSBURG, FLORIDA.

STEERING MECHANISM.

No. 807,156.          Specification of Letters Patent.          Patented Dec. 12, 1905.

Application filed May 12, 1905. Serial No. 260,183.

*To all whom it may concern:*

Be it known that I, WILLIAM KNOX CLEVELAND, a citizen of the United States, and a resident of St. Petersburg, in the county of Hillsboro and State of Florida, have made certain new and useful Improvements in Driving Mechanism, of which the following is a specification.

My invention consists in certain novel features of construction and in combination of parts more fully and particularly hereinafter described and claimed.

In the drawings forming a part hereof, Figure 1 is a front elevation of a vehicle provided with my driving mechanism, partly in section. Fig. 2 is an enlarged vertical longitudinal section of the hub. Fig. 3 is a section on the line 3 3 of Fig. 1. Fig. 4 is a detail of the universal-joint coupling.

In the embodiment of my invention illustrated in the drawings I provide a drive-shaft 1, journaled in bearings in a tube or casing 2, secured to brackets $2^a$, adapted to support a wagon-body 3 and provided with a sprocket-wheel 4, driven by a sprocket-chain 5 from a motor or other source of power. (Not shown.) The drive-shaft 1 comprises a central section $1^a$ and two end sections $1^b$, the end sections being adapted to impart motion to the wheels and connected to the central section by a universal joint 6, comprising in the present instance a split ring 7, each half provided with radial gooves 8 at right angles to each other, and the corresponding grooves in the two parts coacting to form bearings to receive the trunnions 9 on the adjacent ends of the sections $1^a$ and $1^b$ and secured together by bolts $7^c$. The outer third 10 of the section $1^b$ is square in cross-section, and the extreme outer end 11 is screw-threaded to receive a securing-nut 12. The section $1^b$ has journaled thereon a hollow spindle 13, extending outward to the squared portion and provided with a cup-shaped inner end and fitted to receive the ring of the universal joint. The cup-shaped inner end is provided with trunnions 14, pivoted in bearings 15 in the arms 16 of a yoke or bracket 17, comprising two symmetrical halves $17^a$ and $17^b$, secured together in any suitable manner and provided with central enlargements 18, forming a bearing for the central section of the drive-shaft 1, and enlargements 19, forming a socket to receive a brace 20, extending from the casing-brackets $2^a$. The trunnions 14 on the inner or cup-shaped ends of the hollow spindle are in the same transverse plane with the trunnions in the rings 7. In other words, the axis of the trunnions is in line with the vertical axis of the universal joint in any position. A crank-arm 21, rigid with the hollow spindle 13, is connected to the steering-gear. (Not shown.) Grooves 22 on the hollow spindle 13 coact with grooves 23 in the interior of the hub 24 to form ball-races for a ball-bearing 25, and a perforation 26, through the hub 24, covered with the swinging plate 27, serves for the introduction of the balls after the hub is placed upon the spindle. It will be evident that the balls will retain the hub upon the axle and that the nut 12 may be dispensed with. A diaphragm 28, formed within the hub 24 and provided with the square opening 29 is adapted to receive and to closely fit over the squared end 10 of the section $1^b$. By means of this mechanism motion is imparted to the wheel 30.

The hub 24 is composed of a series of disks or rings 31, connected together by bolts 32, passing through holes 33 in the faces of the disks or rings and secured by countersunk nuts 34. In assembling the hub a plurality of rings of the requisite caliber to fit the spindle are placed together, then one or more rings are included having the diaphragm with the squared opening, and, lastly, one or more rings having the opening 35. The rings are then bolted together and the hub may be turned down to the requisite diameter.

In assembling the driving and steering mechanism the central section of the drive-shaft is adjusted in the bearings, the end section is placed in proper position thereto, and the two parts of the encircling ring are secured together. The hollow spindle is then slipped upon the end section, and the yoke-halves are secured together embracing the central section of the drive-shaft, thus securing the spindle in place and bracing it by means of the braces extending from the body-bracket. The hub is slipped upon the spindle, the balls are inserted through the opening, and, if desired, the nut is secured upon the end of the drive-shaft, thus retaining all the parts securely in place.

By my improved construction I am able to impart power directly to all of the wheels of the vehicle, for while I have shown it as applied to the front axle it will be evident that it may with equal facility be applied to the rear axle.

It will be understood that the hub is not necessarily constructed as described. A hub of any construction may be used, it being only necessary to provide means within the hub for engaging the axle to receive power therefrom.

Having thus described my invention, what I claim as new, and desire to secure by Letters Patent, is—

1. In an apparatus of the class described, means for supporting and moving a vehicle-body comprising a bracket provided with a casing, a drive-shaft journaled in the casing and composed of a central section and two end sections, the end section comprising a cylindrical inner portion and a squared outer portion, trunnions on the ends of the central section, trunnions on the inner ends of the end sections and arranged at right angles to the trunnions on the central section, split rings encircling the junctions of the sections and provided with radial openings to form bearings for the trunnions, hollow spindles mounted on the cylindrical portions of the end sections and having cup-shaped inner ends to receive the split rings, ball-races on the outer surfaces of the hollow spindles, trunnions on the inner ends of the hollow spindles and in line with the axes of the drive-shaft-section couplings, yokes journaled on the drive-shafts and provided with bearings to receive the trunnions on the hollow spindles, braces connecting the yokes with the body-supporting bracket, hubs journaled on the hollow spindles and provided on their interior surfaces with ball-races for coacting with the races on the hollow spindles, balls in the races, diaphragms on the hubs and provided with squared openings to receive the square portions of the end drive-shaft sections, and crank-arms on the hollow spindles for turning them on their trunnions.

2. In an apparatus of the class described, vehicle-driving means comprising a drive-shaft consisting of a central and two end sections, trunnions on the ends of the central sections, trunnions on the inner ends of the end sections and at right angles to the trunnions of the central sections, a split ring encircling the junction of the sections and provided with grooves on its coacting faces to form bearings for the trunnions, a hollow spindle journaled in the end drive-shaft section and having a chamber to receive the split ring, trunnions on the inner end of the hollow spindle and in line with the split ring, a yoke journaled on the central section of the drive-shaft and provided with bearings for the spindle-trunnions, a crank-arm rigid with the hollow spindle for swinging it upon its trunnions, a hub journaled on the hollow spindle and provided with means for engaging the end section of the drive-shaft and means for securing the hub on the spindle.

3. In an apparatus of the character described, vehicle-driving means comprising a drive-shaft having central and end sections, trunnions on the adjacent ends of the sections, a split ring encircling the junctions of the sections and engaging the trunnions, a hollow spindle journaled on the end section of the drive-shaft, and adapted to receive the split ring, trunnions on the hollow spindle and in line with the axis of the drive-shaft trunnions, a yoke journaled on the drive-shaft, bearings on the yoke to receive the hollow spindle-trunnions, a hub journaled on the hollow spindle, means for securing the hub to the spindle, means in the hub for engaging the drive-shaft, and means for swinging the hollow spindle upon its trunnions.

4. In an apparatus of the character described, vehicle-driving means comprising a drive-shaft having central and end sections, trunnions on the adjacent ends of the sections, a split ring encircling the junctions of the sections and having bearings for the trunnions, a hollow spindle journaled on the end sections and partially encircling the split ring, trunnions on the hollow spindle and in line with the axis of the drive-shaft trunnions, a yoke journaled on the drive-shaft and having bearings for the hollow spindle-trunnions, a hub journaled on the hollow spindle, means in the hub for engaging the drive-shaft, means for preventing longitudinal movement of the hub upon the hollow spindle, and means for swinging the hollow spindle on its trunnions.

WILLIAM KNOX CLEVELAND.

Witnesses:
J. M. BARKSDALE,
J. R. HARDEE.